US009262126B2

(12) United States Patent
Ghaisas (10) Patent No.: US 9,262,126 B2
(45) Date of Patent: Feb. 16, 2016

(54) RECOMMENDATION SYSTEM FOR AGILE SOFTWARE DEVELOPMENT

(75) Inventor: Smita Ghaisas, Pune (IN)

(73) Assignee: Tata Consultancy Services Limited (IN)

( * ) Notice: Subject to any disclaimer, the term of this patent is extended or adjusted under 35 U.S.C. 154(b) by 680 days.

(21) Appl. No.: 12/971,310

(22) Filed: Dec. 17, 2010

(65) Prior Publication Data

US 2012/0159441 A1    Jun. 21, 2012

(51) Int. Cl.
*G06F 9/44* (2006.01)

(52) U.S. Cl.
CPC ....................................... *G06F 8/10* (2013.01)

(58) Field of Classification Search
CPC ............... G06F 8/10; G06F 8/20; G06F 8/70; G06F 8/60
USPC ........................................................ 717/123
See application file for complete search history.

(56) References Cited

U.S. PATENT DOCUMENTS

| 6,327,551 | B1 * | 12/2001 | Peterson et al. ................... 703/1 |
| 6,728,692 | B1 * | 4/2004 | Martinka et al. ................. 706/45 |
| 7,346,533 | B1 * | 3/2008 | Creel et al. .................... 705/7.17 |
| 7,401,087 | B2 * | 7/2008 | Copperman et al. .......... 707/737 |
| 2002/0188434 | A1 * | 12/2002 | Shulman et al. ................ 703/21 |
| 2003/0009740 | A1 * | 1/2003 | Lan ............................... 717/102 |
| 2003/0101089 | A1 * | 5/2003 | Chappel et al. ................ 705/10 |
| 2005/0021348 | A1 * | 1/2005 | Chan et al. ........................ 705/1 |
| 2005/0096937 | A1 * | 5/2005 | Subash et al. .................... 705/1 |
| 2005/0197998 | A1 * | 9/2005 | Asbury ............................ 707/1 |
| 2006/0047632 | A1 * | 3/2006 | Zhang ............................. 707/3 |
| 2006/0156137 | A1 * | 7/2006 | Raul et al. ..................... 714/738 |
| 2008/0091720 | A1 * | 4/2008 | Klumpp et al. ............ 707/104.1 |
| 2008/0162266 | A1 * | 7/2008 | Griessmann et al. .......... 705/10 |
| 2010/0280989 | A1 * | 11/2010 | Mehra et al. .................... 706/59 |

OTHER PUBLICATIONS

Kaiya et al, "Using Domain Ontology as Domain Knowledge for Requirements Elicitation", Published May 2006, IEEE, 1-10.*

(Continued)

*Primary Examiner* — Chat Do
*Assistant Examiner* — Sergio J Curbelo, III
(74) *Attorney, Agent, or Firm* — Schwegman Lundberg & Woessner, P.A.

(57) ABSTRACT

Methods and systems described herein implement a recommendation system for providing recommendations for generating a requirements specification for agile software development. In one implementation, the system includes a processor and a memory coupled to the processor. The memory comprises a mapping module and an agile recommendation module. The mapping module is configured to map knowledge elements of at least one ontology instance selected from among a plurality of ontology instances with another ontology instance selected from among the plurality of the ontology instances. The agile recommendation module is configured to generate a knowledge corpus based on the mapped knowledge elements of the ontology instances and at least one environmental parameter, receive modifications in the knowledge corpus, and provide recommendations to generate a requirements specification based at least, in part, on the received modifications.

15 Claims, 4 Drawing Sheets

(56) References Cited

OTHER PUBLICATIONS

Kumar, Manish, et al., "Towards Knowledge Assisted Agile Requirements Evolution", RSSE '10, Cape Town, South Africa, (May 4, 2010), 5 pgs.

Rose, Preethu, et al., "A Method and Framework for Domain Knowledge Assisted Requirements Evolution (K-RE)", Proceedings of CONSEG-09; International Conference on Software Engineering, Chennai, India, (Dec. 17, 2009), 87-97.

* cited by examiner

RECOMMENDATION SYSTEM FOR AGILE SOFTWARE DEVELOPMENT

FIELD OF INVENTION

The present subject matter, in general, relates to agile software development and, in particular, relates to a recommendation system for agile software development.

BACKGROUND

Generally, prior to designing any software product or application, the requirements of its users are captured. For this, the requirements are defined in a requirements specification, prepared typically by a requirement analyst. The requirement analyst is responsible for identifying the requirements after interaction with the users and other stakeholders. To understand the requirements of the users and to, subsequently, concretize the requirements, knowledge of the domain to which the software is related, i.e., domain knowledge, is required. For example, if the software is being developed for an insurance company, it is desired that the requirement analyst has access to knowledge about insurance norms and practices. The requirement analyst generally obtains the requisite domain knowledge from a domain expert. However, the services of the domain expert are usually very expensive and add to the overall cost of developing the software.

In general, the teams including the requirement analyst and programmers, who capture the user requirements and develop the application are geographically distributed and do not have a common business language to efficiently and effectively interact with each other. Further, since the teams are geographically distributed, the availability of the domain expert cannot be ensured at all times and for each and every team.

Further, in traditional software development methodologies, a rigid structure is followed throughout the software development lifecycle. Everything, from the requirements specification to the final delivery and maintenance, is documented in the beginning itself and strictly followed. Therefore, modifications, which may be required due to change in requirements, for example, changed user preferences, become difficult to implement, both in terms of cost and complexity.

Agile software development methodologies, on the other hand, involve rapid software development with shorter development lifecycle and greater collaboration between various stakeholders. The shorter development life cycle is ensured by developing an application in various logical and coherent units of functionalities, also referred to as iterations.

SUMMARY

The subject matter described herein relates to a method and a system for providing recommendations for generating requirements specification for agile software development, which are further described below in the detailed description. This summary is not intended to identify essential features of the claimed subject matter nor is it intended to be used in determining or limiting the scope of the claimed subject matter.

The present subject matter discloses a method and a system for providing recommendations for generating a requirements specification for agile software development. In one implementation, the system includes a processor and a memory coupled to the processor. The memory comprises a mapping module and an agile recommendation module. The mapping module is configured to map knowledge elements of at least one ontology instance selected from among a plurality of ontology instances with another ontology instance selected from among the plurality of the ontology instances. The agile recommendation module is configured to generate a knowledge corpus based on the mapped knowledge elements of the ontology instances and at least one environmental parameter, receive modifications in the knowledge corpus, and provide recommendations to generate a requirements specification based at least, in part, on the received modifications.

BRIEF DESCRIPTION OF THE DRAWINGS

The above features and aspects and other features and aspects of the subject matter will be better understood with regard to the following description, appended claims, and accompanying figures. In the figures, the left-most digit(s) of a reference number identifies the figure in which the reference number first appears. The use of the same reference number in different figures indicates similar or identical items.

DETAILED DESCRIPTION

The present subject matter discloses a method and a system for providing recommendations for preparation of a requirements specification for agile software development. Agile software development is a software development methodology that involves developing and subsequently, delivering software in iterations or sprints. The development and delivery of such iterations is in accordance with the preferences and requirements of a user of the software. Therefore, such user preferences and requirements are generally captured by say, a requirement analyst, in the form of the requirements specification.

Further, to understand the user requirements and prepare the requirements specification, domain knowledge is desired. Since the requirement analyst is not a domain expert, the requirement analyst may seek the services of the domain expert who renders domain knowledge to prepare the requirements specification incorporating the user requirements. However, the services of a domain expert are generally very expensive. Moreover, the services of the domain expert may not be available to each team involved in the agile software development as the teams are usually geographically distributed. Further, even though various existing tools provide collaboration tools for allowing teams that are geographically distributed and/or teams that may be used to different terminologies to communicate, such tools may fail to effectively and efficiently capture the user requirements. This, in turn, translates into a requirements specification, which may not be complete, correct and consistent.

To this end, the present subject matter discloses a method and a system for providing recommendations for agile software development based at least on domain knowledge and subsequently, generating a requirements specification. As used herein, domain is defined as the field of knowledge for which the requirements specification is to be prepared. For example 'insurance' may be the domain in cases where software is related to underwriting, claims management, etc.

In one implementation, the domain knowledge is organized in the form of instances of ontologies stored in a knowledge base. An ontology instance defines a common vocabulary for people who need to share information within a domain. The ontology instance includes machine-interpretable and human readable definitions of basic concepts of the domain and the relations among these basic concepts. The ontology instance, in one example, is created using a resource description framework (RDF)-web ontology language (OWL) schema. In one example, four types of ontology instances, namely, Environmental Context Ontology Instance, Agile Requirements Ontology Instance, Requirements Ontology Instance and Problem Domain Ontology Instance are used. As mentioned before, the ontology instances are stored in the knowledge base associated with a recommendation system.

In one implementation, the recommendation system includes a mapping module and an agile recommendation module. The mapping module maps knowledge elements of at least one ontology instance selected from among a plurality of ontology instances with another ontology instance selected from among the plurality of ontology instances. Based on the mapping and at least one environmental parameter received from a user, such as a requirement analyst, the agile recommendation module generates a knowledge corpus. The knowledge corpus may be defined as a set of core features in a given domain and associated knowledge elements, namely business processes, rules, policies, partial data models, use cases, test cases, user stories, features, tasks, product backlog, sprints, and prototype plans. The knowledge elements of one ontology instance are mapped to the knowledge elements of another ontology instance.

Further, in one implementation, the knowledge corpus is presented to the requirement analyst. Again, based on the modifications received from the requirement analyst, the agile recommendation module provides recommendations to generate a requirements specification. In another implementation, the recommendations may be obtained by applying inference rules on the underlying ontology instances. In one implementation, the recommendation system also facilitates automated generation of requirements specification, such as editable and evolvable business process maps, use case models, and data models, which form inputs for downstream development.

The recommendation system disclosed herein provides several advantages over the existing systems due to incorporation of the domain knowledge into agile software development framework. The recommendation system reduces the effort associated with sharing of knowledge documents and also the probability of misunderstanding between development teams. Further, as the agile software development involves frequent delivery of the iterations to the customers, certain iterations are prioritized over others. Once a time frame for delivering a particular iteration is finalized, it helps to identify other iterations which may be required for functioning of the particular iteration. The recommendation system, as per one implementation of the present subject matter, provides a requirements specification suggesting prioritization of iterations based at least on the knowledge corpus. The recommendation system further enables gathering of customer feedback at the initial stages of the software development lifecycle, thereby minimizing errors in the requirements specification.

In addition, the recommendation system proactively guides the requirement analyst in preparation of the requirements specification, and therefore, even a less experienced requirement analyst is able to take informed decisions and prepare complete, correct, and consistent requirements specification.

The following disclosure describes systems and methods for online domain specific recommendations for generating requirements specification for agile software development. While aspects of the described systems and methods can be implemented in any number of different computing systems, environments, and/or configurations, embodiments for generating requirements specification for agile software development are described in the context of the following exemplary system(s) and method(s).

Figure 1:
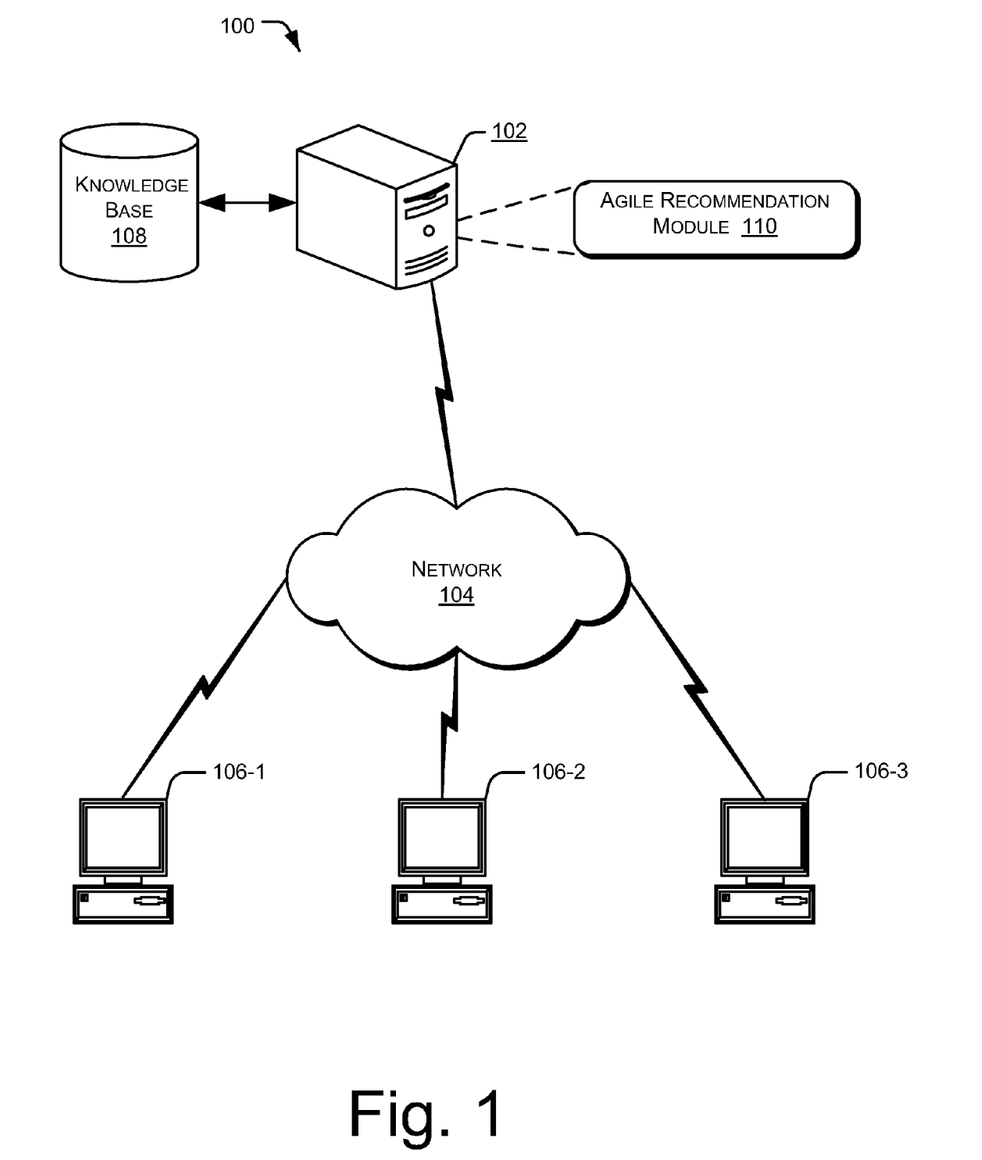
FIG. 1 illustrates an exemplary network environment implementing a recommendation system in accordance with one embodiment of the present subject matter.

FIG. 1 illustrates an exemplary network environment 100 implementing a recommendation system 102 configured to provide domain-specific recommendations for generation of a requirements specification for agile software development, according to an embodiment of the present subject matter. In one embodiment, the network environment 100 includes a network 104 for enabling communication between the recommendation system 102 and a plurality of user interface devices 106-1, 106-2, . . . , 106-N, hereinafter referred to as user interface device(s) 106.

The network 104 may be a wireless network, a wired network, or a combination thereof. The network 104 can also be an individual network or a collection of many such individual networks, interconnected with each other and functioning as a single large network, for example, the Internet or an intranet. The network 104 can be implemented as one of the different types of networks, such as intranet, local area network (LAN), wide area network (WAN), the internet, and such. Further, the network 104 may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other.

Further, the user interface devices 106 may be one or more processor-driven computing devices, such as desktop computers, portable computers, network computers, and hand-held devices. In one implementation, the recommendation system 102 is also a processor-driven computing device, such as mainframe computer, workstation, desktop computer, hand-held device, multiprocessor system, personal digital assistant (PDA), laptop computer, network computer, mini-computer, and server. Alternatively, the recommendation system 102 may also be implemented as multiple servers to concurrently perform a number of tasks. In an example the recommendation system 102 works on a web 2.0 platform to facilitate collaborations between various stakeholders, for example, project managers, customers of the software, etc. However, the recommendation system 102 may work on other similar platforms.

In an implementation, the recommendation system 102 includes an agile recommendation module 110 to at least provide domain-specific recommendations to a user, such as a requirement analyst, for preparation of a requirements specification. Further, the agile recommendation module 110 may generate the requirements specification incorporating the domain-specific recommendations. In another implementation, the agile recommendation module 110 generates a requirements specification indicating priorities of the various iterations, as per user preferences.

The network environment 100 further comprises a knowledge base 108 associated with the recommendation system 102. The knowledge base 108 includes data required for the functioning of the recommendation system 102. It will be understood that although the knowledge base 108 has been shown external to the recommendation system 102; however, the knowledge base 108 may be located within the recommendation system 102.

In operation, the requirement analyst interacts with the recommendation system 102 through the user interface device 106, as per one implementation of the present subject matter. Based on the interaction, the agile recommendation module 110 provides a list of tasks which the requirement analyst may wish to perform. For example, the agile recommendation module 110 provides the requirement analyst with a choice to prepare a requirements specification using the recommendation system 102. On receiving an input for preparing the requirements specification from the requirement analyst, the recommendation system 102 provides the requirement analyst with different environmental parameters, such as domain, line of business, geography, and type of project, for which the requirements specification may be prepared. The requirement analyst then selects the desired environmental parameters for defining requirements for development of the software.

Alternatively, in another implementation, the recommendation system 102 receives the environmental parameters based on previous interactions of a user. Such interactions may have been stored within the recommendation system 102 for development of software pertaining to the same or similar domain. Based on the selected environmental parameters, the recommendation system 102 accesses the knowledge base 108 and retrieves a pertinent knowledge corpus from the knowledge base 108. Such a knowledge corpus is provided to a user, for example, the requirement analyst for further processing. Alternatively, the knowledge corpus is provided to a validation module (not shown in the figure) for validating the pertinence of the knowledge corpus based on, for example, user-defined rules stored in the knowledge base 108.

The knowledge corpus may be defined as a set of core features in a given domain and associated knowledge elements. For example, the knowledge elements may include business processes, rules, policies, partial data models, use cases, test cases, user stories, features, tasks, product backlog, sprints, and prototype plans. The knowledge elements of one ontology instance are mapped to the knowledge elements of another ontology instances. Based at least on the mapping of the knowledge elements and semantic inferences extracted from the ontology instances by application of inference rules, either the knowledge elements may be modified or new knowledge elements may be introduced by the user, for example the requirement analyst, to prepare the requirements specification according to requirements of the software.

Further, in one implementation, the recommendation system 102 provides semantic assistance to the requirement analyst in the form of domain-specific recommendations, also referred to as recommendations, based on the modified or newly introduced knowledge elements. Based on the recommendations generated by the recommendation system 102, the recommendation system 102 generates a requirements specification, which may include documents detailing the requirements, prototypes, and executable models. The requirements specification may also include prioritization of the iterations. The operation and construction of the recommendation system 102 is described in detail in subsequent paragraphs.

Figure 2A:
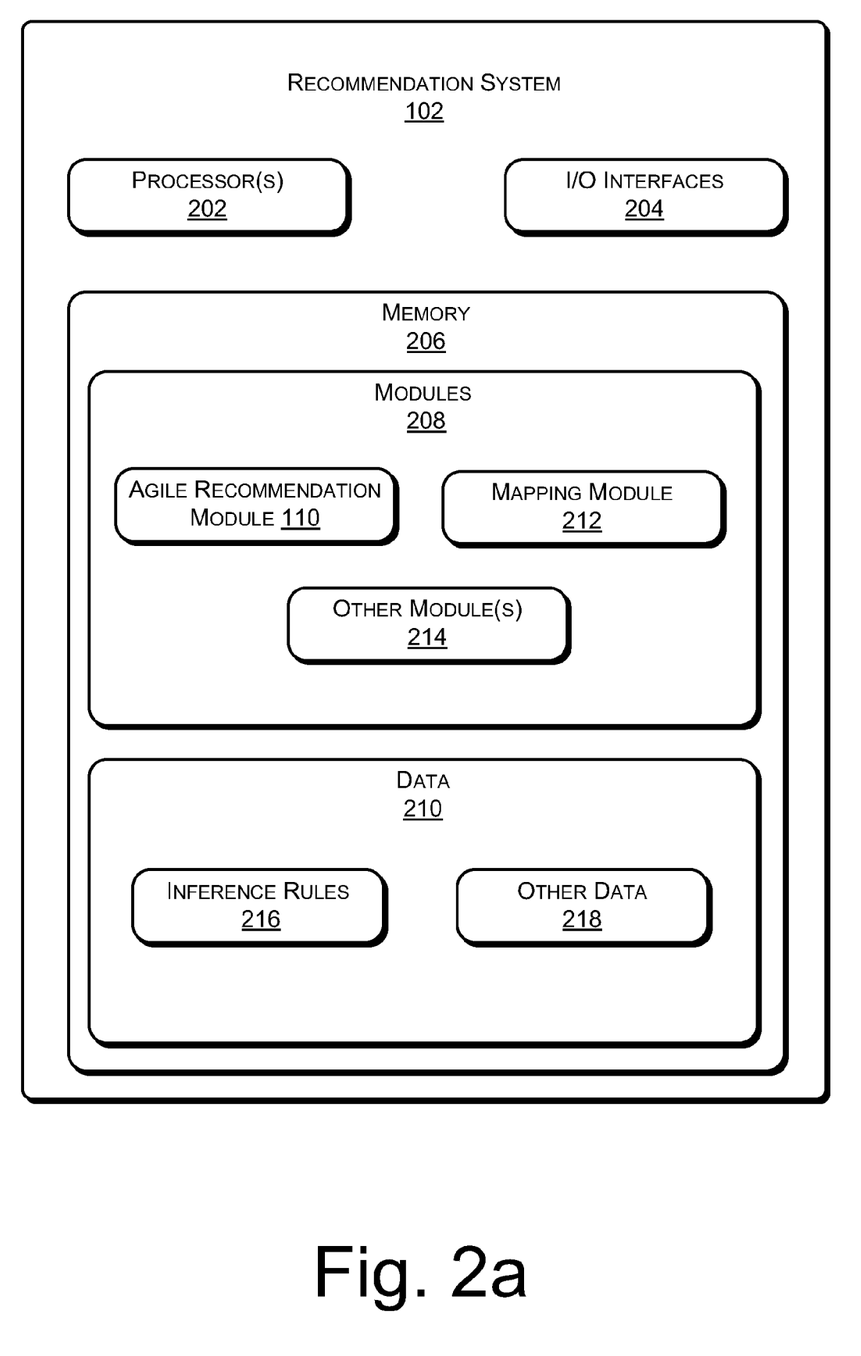
FIG. 2a illustrates an exemplary recommendation system in accordance with one embodiment of the present subject matter.

FIG. 2a illustrates the components of the exemplary recommendation system 102, in accordance with one embodiment of the present subject matter. In said embodiment, the recommendation system 102 includes processor(s) 202, I/O interfaces 204, and a memory 206.

The processor(s) 202 can be a single processing unit or a combination of multiple processing units. The processor(s) 202 can be implemented as one or more microprocessors, microcomputers, microcontrollers, digital signal processors, central processing units, state machines, logic circuitries, or any devices that manipulate signals based on operational instructions. Among other capabilities, the processor(s) 202 are configured to fetch and execute computer-readable instructions and data stored in the memory 206.

The I/O interfaces 204 may include a variety of software and hardware interfaces, for example, interface for peripheral device(s), such as a keyboard, a mouse, an external memory, and a printer. Further, the I/O interfaces 204 may enable the recommendation system 102 to communicate with other computing devices, such as web servers, the knowledge base 108 (shown in FIG. 1), other external databases, and user interface devices 106 via one or more ports. The I/O interfaces 204 may facilitate multiple communications within a wide variety of protocols and networks, such as the network 104, including wired networks, e.g., LAN, cable, etc., and wireless networks, e.g., WLAN, cellular, satellite, etc.

The memory 206 can include any computer-readable medium known in the art including, for example, volatile memory (e.g., RAM) and/or non-volatile memory (e.g., flash, etc.). The memory 206 includes module(s) 208, and data 210.

In one implementation, the modules 208 include the agile recommendation module 110 configured to provide domain-specific recommendations, for example, to the requirement analyst or a validation module (not shown in the figure). Further, the modules 208 include a mapping module 212 configured to map the knowledge elements of various ontology instances of the knowledge base 108 with one another. The modules 208 may include other module(s) 214 may include programs that supplement applications implemented by the recommendation system 102. The modules 208, in general, include routines, programs, objects, components, data structures, etc., that perform particular task or implement particular abstract data types.

The data 210 include inference rules 216 that operate on the ontology instances of the knowledge base 108 and other data 218. For example, the inference rules 216 may include one or more rules to suggest synonyms, say from within a thesaurus, if a new word is detected. The operation of the recommendation system 102 has been described in detail in conjunction with reference to FIG. 2(b).

Figure 2B:
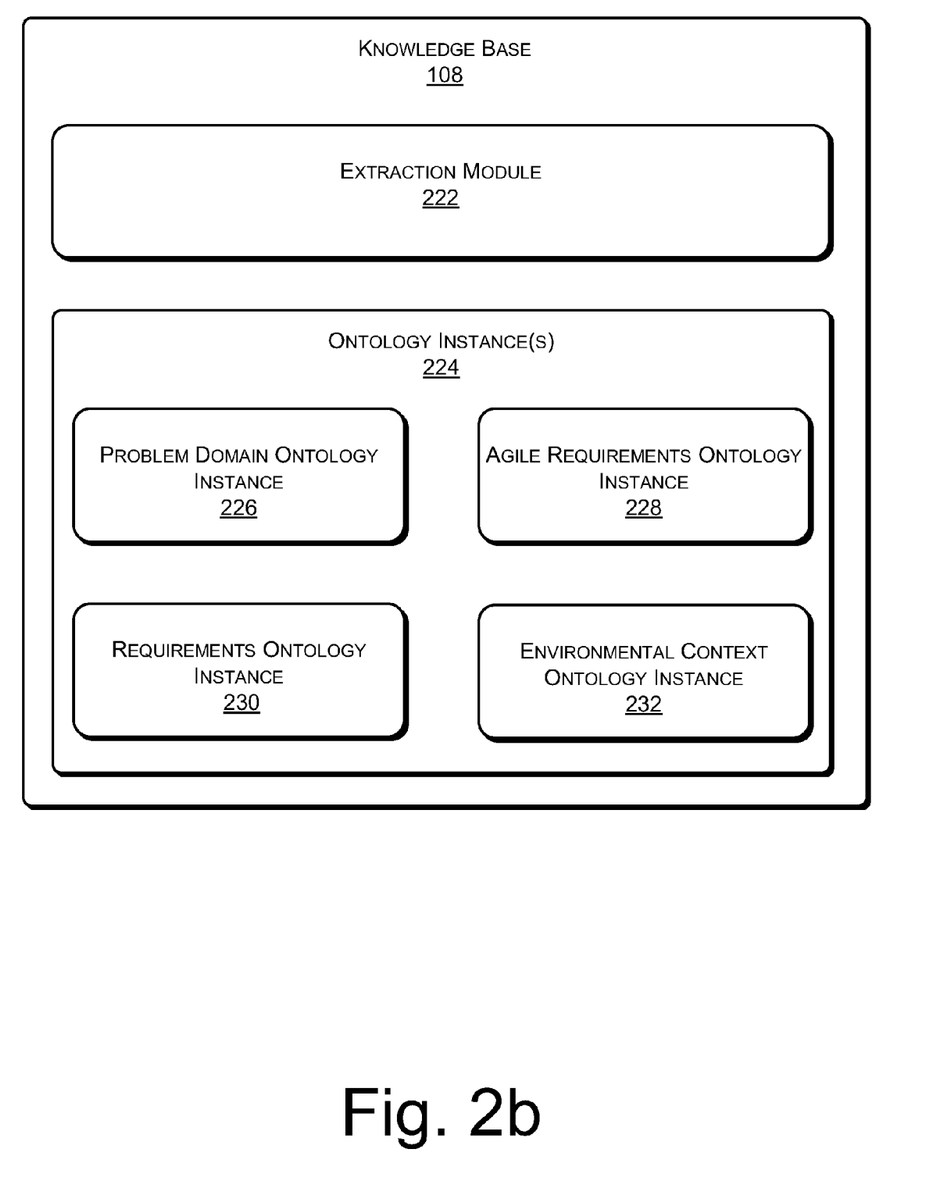
FIG. 2b illustrates an exemplary knowledge base in accordance with one embodiment of the present subject matter.

FIG. 2b illustrates the knowledge base 108, in accordance with one embodiment of the present subject matter. In one implementation, the knowledge base 108 includes an extraction module 222 and a plurality of ontology instances 224. The extraction module 222 is associated with the inference rules 216 residing within the recommendation system 102 to provide domain-specific recommendations, as will be explained in subsequent paragraphs.

The ontology instances 224, define a common vocabulary for users who share information within a domain. A domain, as described earlier, is a field of knowledge for which the requirements specification is to be prepared, for example 'insurance' may be the domain in case the software is related to underwriting. The ontology instance includes human readable and machine-processable definitions of basic concepts in the domain and relations among the basic concepts. In an example, the ontology instances 224 are created using a resource description framework (RDF)-web ontology language (OWL) schema.

The ontology instances 224, in accordance with one embodiment of the present subject matter, include, but are not limited to, a Problem Domain Ontology instance 226, an Agile Requirements Ontology Instance 228, a Requirements Ontology Instance 230 and an Environmental Context Ontology Instance 232. In one implementation, the Environmental Context Ontology Instance 232 is configured to capture the domain knowledge related to an environment for which software requirements are to be defined. For example, a requirement analyst designing software for a customer working in life insurance industry in the Asia-Pacific region may want to capture requirements for a claims iteration of a life insurance application. The abstractions, such as actor, action, domain, line of business, geography are used to capture such information. The Requirements Ontology Instance 230 captures the domain knowledge related to knowledge elements, such as business goals, features, business processes and sub-processes, business constraints (laws of the land, organizational policies), use cases, and business entities. Further, in said implementation, the Problem Domain Ontology Instance 226 provides the abstractions to capture the essence of the domain. For example, consider a scenario: 'in an event of death of a policy holder, a beneficiary may submit a claim request'. The abstractions, such as business event, business type, party, and business action are used to capture such information.

The agile requirements ontology instance 228 is configured to capture abstractions specific to the agile requirements elements, for example user story, feature, and product backlog, sprint and so on. A user story is one or more sentences in the natural or business language of the user and captures what the user wishes to achieve through the software. A product backlog is a list that contains broad descriptions of all potential features, prioritized as an absolute ordering by business value.

In an implementation, the various ontology instances 224 are mapped to each other using the mapping module 212. In one implementation, the mapping module 212, within the recommendation system 102, maps the various knowledge elements stored in the ontology instances 224 with one another. For example, the mapping module 212 may map the knowledge elements stored in the Requirements Ontology Instance 230 with knowledge elements stored in the Agile Requirements Ontology Instance 228 which represents agile requirements context.

Consider the following mappings only as an illustration and for better understanding of the present subject matter. The Business Events (e.g., Claim submission), Business Actions (e.g., Investigate Claim) and Business Decisions (e.g., Adjugation) in the Problem Domain Ontology Instance 226 are represented as Business Process (e.g., Claims Handling) in the Requirements Ontology Instance 230. Business Goals (e.g. Reduce Costs) in the Requirements Ontology Instance 230 are designed to deliver Business Value, (e.g., Profit margin) a concept in Problem Domain Ontology Instance 226.

In a similar manner, Business Constraint (e.g. a new legislation) in the Problem Domain Ontology Instance 226 in maps to Validation (e.g., Verify conformance to rule) in the Requirements Ontology Instance 230. The Business Party (e.g., Insurer) Business Object (e.g., Claim), Business Document (e.g., Policy) from the Problem Domain Ontology Instance 226 contribute to Data Element in the Requirements Ontology Instance 230. Feature (e.g., Claim intimation and booking) in Agile Requirements Ontology Instance 228 maps to Sub Process (Claim Intimation process) in the Requirements Ontology Instance 230. User Story and Task in the Agile Requirements Ontology Instance 228 maps to Use Case in the Requirements Ontology Instance 230. In one embodiment, the mapping module 212 also includes bridge classes (not shown) to specify semantic mappings of conclusions drawn from one ontology instance to knowledge elements of another ontology instance. In one implementation, the bridge classes are written in a semantic web rule language (SWRL).

The working of the recommendation system 102 and the knowledge base 108 may be better understood by taking an example of software for which requirements specification is to be prepared. Based on the software to be developed, the user, for example, the requirement analyst, selects environmental parameters, such as domain, geography, line of business, etc., from a set of environmental parameters provided by the agile recommendation module 110. For example, in case of a life insurance application, the domain is insurance, the line of business is life, and the geography is say Asia. As mentioned before, such a selection may also be performed by a validation module (not shown in the figure) based on previous interactions with the user. In one embodiment, the agile recommendation module 110, based on the selection, provides the extraction module 222 with the selected environmental parameters. The extraction module 222 identifies the ontology instances based on the selected environmental parameters. Further, based on at least one of the inference rules 216 and the identified ontology instances, the extraction module 222 provides a relevant knowledge corpus to the agile recommendation module 110.

As mentioned before, the knowledge corpus includes a core set of features and associated knowledge elements, such as business processes, rules, policies, partial data models, use cases and test cases, pertinent to the software or application to be developed. Such knowledge elements are mapped, in one implementation, to agile requirement elements, such as user stories, features, tasks, product backlog, iterations, and prototype plans.

In one implementation, the agile recommendation module 110 provides the knowledge corpus to the user, say the requirement analyst, for validation. Alternatively, such a validation may be performed by a computer implementable module having user instructions stored thereon. Additionally, such validation may be performed by extracting relevant information from expert forums through semantically enriched collaboration tools. The validation may include modification of the knowledge elements, such as the user story, to suit the requirements of the software in question. Further, the requirement analyst also selects features that are pertinent to the software.

Based on a selection of features from within the knowledge corpus, the agile recommendation module 110 provides recommendations specific to the software being developed or the domain to which the software relates based at least on semantic inferences extracted from one of the underlying ontology instances by application of the inference rules 216. Examples of recommendations include, but are not limited to, recommendations related to iterations, identified iterations relevant to the software being developed, complementary or conflicting nature of the features, splitting of a feature, the business rules/policies relevant to the features, business glossary, and business process. For example, corresponding to iteration related to an insurance application, a requirement analyst may select a feature 'claim initiation' and not select a feature 'claim review and inspection'. However, the feature 'claim review and inspection' complements the feature 'claim initiation'. In such a scenario, the agile recommendation module 110 may provide recommendation to include the feature 'claim review and inspection' when the feature 'claim initiation' is provided in the aforesaid iteration.

In one implementation, the agile recommendation module 110 may also provide recommendation in the form of domain-specific assistance on aspects, such as synonymy of terms, relevant business rules in the selected geography, data models, customer specific business policies derived from previously generated requirements specifications for the same user, and interactions of the selected domain with the other domains. For this, the agile recommendation module 110 may use lexical decomposition techniques to resolve requirements descriptions, provided by the requirement analyst, into constituent terms.

Further, the agile recommendation module 110 detects the terms which act as pointers to knowledge elements, such as user stories, use cases, and tasks associated with the features, in the Problem Domain Ontology Instance 226. The Problem Domain Ontology Instance 226 also includes details regarding synonym relationship among certain terms. If the requirement analyst uses a synonymous term, the agile recommendation module 110 provides recommendation to replace it with the most commonly used term. For example, if the requirement analyst enters a feature, 'verify customer details and send notification to the insured', the agile recommendation module 110 may prompt the requirement analyst that 'customer' and 'insured' are synonymous terms but 'insured' is the most commonly accepted term. Similarly, if the requirement analyst uses a term 'adjudicator' while preparing the requirements specification, the agile recommendation module 110 may provide a recommendation or an alert stating that 'Arbitrator' is a more commonly accepted term.

Based on the generated recommendations, the requirement analyst may or may not provide additional inputs. If no new additional input is received, the agile recommendation module 110 generates a requirements specification that conforms to requirements of the software.

In this fashion, the agile recommendation module 110 provides the user, for example, the requirement analyst with domain-specific recommendations based at least on the selected environmental parameter and inference rules 216 that operate over the underlying ontology instances 224. In another implementation, the agile recommendation module 110 also generates a requirements specification, which captures the recommendations and assigns priorities to the identified iterations for development of the software. The requirements specification, as mentioned before, includes documents detailing the requirements, executable models and prototypes. Further, the requirements specification may be provided in both text and graphical format. Such requirements specifications may be stored in the recommendation system 102 for future use.

Figure 3:
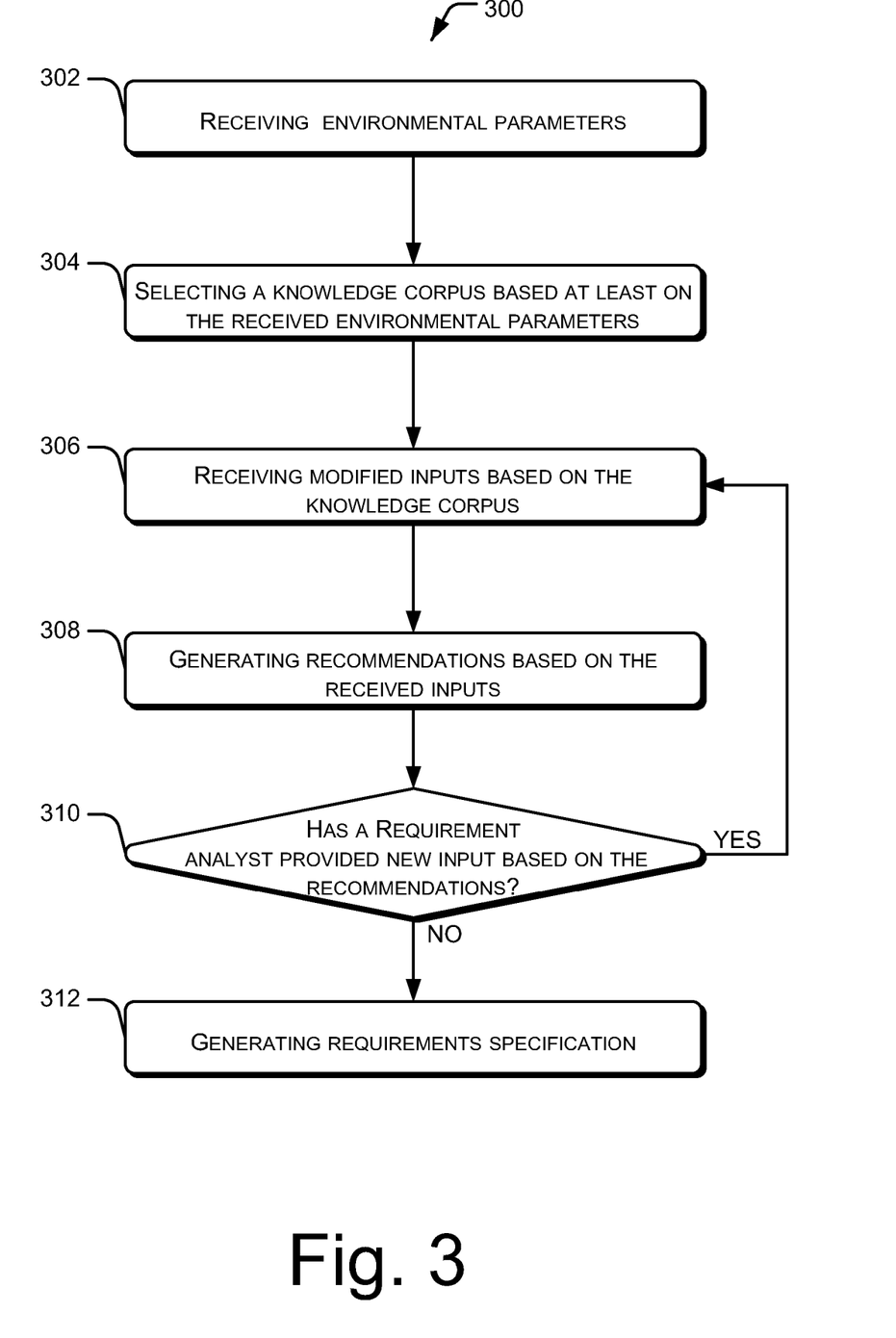
FIG. 3 illustrates a method for providing recommendations for agile software development in accordance with one embodiment of the present subject matter.

FIG. 3 illustrates a method 300 for providing domain-specific recommendations to the requirement analyst for preparation of the requirements specification for agile software development, according to one embodiment of the present subject matter. The exemplary method may be described in the general context of computer executable instructions. Generally, computer executable instructions can include routines, programs, objects, components, data structures, procedures, modules, functions, etc., that perform particular functions or implement particular abstract data types. The method may also be practiced in a distributed computing environment where functions are performed by remote processing devices that are linked through a communications network. In a distributed computing environment, computer executable instructions may be located in both local and remote computer storage media, including memory storage devices.

The order in which the method is described is not intended to be construed as a limitation, and any number of the described method blocks can be combined in any order to implement the method, or an alternative method. Additionally, individual blocks may be deleted from the method without departing from the spirit and scope of the subject matter described herein. Furthermore, the method can be implemented in any suitable hardware, software, firmware, or combination thereof. The method is presently provided for providing recommendations to a single requirement analyst. It would be appreciated that the same method can also be implemented for a plurality of requirement analysts without deviating from the scope of the present subject matter. Further, the validation performed by the requirement analyst can also be performed by a module associated with user-defined instructions. Additionally, even though the description is in context of a recommendation system, such as the recommendation system 102, and knowledge base, a knowledge base 108, the description can be extended to other systems as well.

At block 302, one or more environmental parameters are received. In one implementation, the environmental parameters selected by a user, such as a requirement analyst, are received by the recommendation system 102. In another implementation, the environment parameters may be selected based on history of prior interactions with the user. The environmental parameters may include domain, line of business, geography, and type of project and may be selected according to the requirements of the software.

At block 304, a knowledge corpus is selected based on the received environmental parameters. For example, the extraction module 222 identifies pertinent ontology instances 224 residing in the knowledge base 108 and selects a knowledge corpus by matching the received environmental parameters with one or more knowledge elements within the identified ontology instances 224 The knowledge corpus includes a core set of features and knowledge elements such as user stories, tasks, associated business rules, business processes, use cases, test cases, and data models. For example, a requirement analyst working in life insurance domain in Asia-pacific region for a customer ABC Insurance is provided with a knowledge corpus different from that provided to another requirement analyst working on the same domain but in Europe region for a customer XYZ insurance. By providing the above distinction, The recommendation system 102 addresses the fact that stakeholders may need to conform to different laws of land, may be used to different terminologies depending on where they are located, and may have different organizational policies even though the domain is same. Such knowledge elements are mapped, in one implementation, to other knowledge elements, such as user stories, features, tasks, product backlog, iterations, and prototype plans.

Subsequently, in one implementation, the knowledge corpus is provided to the user, such as a requirement analyst, for validation. After the agile recommendation module 110 provides knowledge corpus to the user, the user may modify and enhance the features and/or knowledge elements to suit specific software requirements.

At block 306, modifications are received. In one example, based on the knowledge corpus provided to the user, the recommendation system 102 receives modifications from the requirement analyst.

At block 308, recommendations are generated based at least on the received modifications. In one implementation, the agile recommendation module 110 interacts with the knowledge base 108 to generate one or more recommendations on the basis of the modifications received from the user. As the user defines new knowledge elements or alters existing knowledge elements. For example, the user identifies a new use case or modifies an existing business rule, and the text is parsed for detection of new business terms. The detected terms are matched with the knowledge elements from the ontology instances 224 of the knowledge base 108. Further, recommendations are generated specific to the software being developed or the domain to which the software relates based at least on modifications and semantic inferences, which are extracted from one of the underlying ontology instances. Examples of recommendations include, but are not limited to, recommendations related to iterations, complementary or conflicting nature of the features, splitting of a feature, the business rules/policies relevant to the features, business glossary, and business process. In an example, the recommendation system 102 provides the generated recommendations to the user. The user may accept or reject the recommendations.

At block 310, the recommendation system 102 determines whether the requirement analyst has provided further inputs based on the recommendations. If the user has provided further input, that is the "Yes" path from the block 310, the control proceeds to block 306. In case it is determined that the requirement analyst has not provided any further input, that is the "No" path from the block 310, the requirements specification are generated at block 312. The requirements specification includes documents detailing the requirements executable models and prototypes.

The present subject matter has been described with reference to the recommendation system 102 used for providing the recommendations to the requirement analyst in agile requirements framework but a person skilled in the art would know that the recommendation system 102 can also be used for providing recommendations in other software development methodologies as well.

Although embodiments for providing domain-specific recommendations to the requirement analyst for agile software development have been described in language specific to structural features and/or methods, it is to be understood that the invention is not necessarily limited to the specific features or methods described. Rather, the specific features and methods are disclosed as exemplary embodiments for providing domain-specific recommendations to the requirement analyst for agile software development.

I claim:

1. A system for generating requirements specification to develop functionalities of a software, the system comprising:
   a processor; and
   a memory coupled to the processor, wherein the memory comprises,
      a mapping module configured to map knowledge elements of at least one ontology instance for a domain, selected from among a plurality of ontology instances in a knowledge base, with another ontology instance, selected from among the plurality of ontology instances based on an input received from a user and wherein the ontology instance defines a common vocabulary, in a machine-readable and processable format, for users who share information within the domain associated with the software being developed, for which the requirements specification is being generated, wherein the mapping module includes a plurality of bridge classes to specify semantic mappings of conclusions drawn from at least one said plurality of ontology instances; and
      an agile recommendation module configured to,
         generate a knowledge corpus from the knowledge base based on the mapped knowledge elements and one or more environmental parameters selected by the user, wherein:
            the one or more environmental parameters are selected to define requirements for developing functionalities of the software;
            the one or more environmental parameters include a geographic region; and
            the knowledge corpus includes features and associated knowledge elements based on the selected one or more environmental parameters;
         receive at least one modification in the knowledge corpus based on a selection of one or more of the features and the associated knowledge elements in the knowledge corpus by the user, wherein the selection includes one of a modification and enhancement of the features and the associated knowledge elements;
         generate recommendations specific to the domain from the knowledge base based on the received at least one modification, said generation facilitated by using a plurality of lexical decomposition techniques to resolve a plurality of requirement descriptions; and
         generate the requirements specification for the domain by incorporating the user's response to the recommendations, wherein the requirements specification indicates prioritization of a plurality of iterations, the plurality of iterations being indicative of logical and coherent units of functionalities of the software to be developed; and
      an extraction module configured to,
         apply at least one inference rule on the plurality of ontology instances in the knowledge base to identify an ontology instance from among the plurality of ontology instances based on the selected one or more environmental parameters; and
         extract semantic inferences from the identified ontology instance by matching the selected one or more environmental parameters and the mapped knowledge elements to provide the knowledge corpus.

2. The system as claimed in claim 1, wherein the agile recommendation module is further configured to provide the recommendations based on the semantic inferences extracted from the identified ontology instances and the at least one modification.

3. The system as claimed in claim 1, wherein the knowledge corpus comprises business processes, rules, policies, partial data models, use cases, test cases, user stories, features, tasks, product backlog, iterations, and prototype plans.

4. The system as claimed in claim 1, wherein the at least one environmental parameter is one of a domain, line of business, and a type of project.

5. The system as claimed in claim 1, wherein the plurality of ontology instances comprises a Problem Domain Ontology Instance, an Agile Requirements Ontology Instance, a Requirements Ontology Instance, and an Environmental Context Ontology Instance.

6. The system as claimed in claim 1, wherein the requirements specification is at least one of a document detailing requirements, a prototype and an executable model.

7. A method for generating requirements specification to develop functionalities of a software, the method comprising:
   mapping knowledge elements of at least one ontology instance, selected from among a plurality of ontology instances in a knowledge base, with another ontology instance for a domain, selected from among the plurality of ontology instances based on an input received from a user and wherein the ontology instance defines a common vocabulary, in a machine-readable and processable format, for users who share information within the domain associated with the software being developed for which the requirements specification is being generated, wherein mapping knowledge elements using one or more bridge classes to specify semantic mappings of conclusions of a first ontology instance to the knowledge elements of a second ontology instance;

providing a knowledge corpus from the knowledge base based at least on one or more environmental parameter selected by the user and the mapped knowledge elements, wherein:
  the one or more environmental parameters are selected to define requirements for developing functionalities of the software;
  the one or more environmental parameters include a geographical region; and
  the knowledge corpus includes features and associated knowledge elements based on the selected one or more environmental parameters;

receiving at least one modification in the knowledge corpus based on a selection of one or more of the features and the associated knowledge elements in the knowledge corpus by the user, wherein the selection includes one of a modification and enhancement of the features and the associated knowledge elements;

providing recommendations specific to the domain from the knowledge base based on the received at least one modification and using a plurality of lexical decomposition techniques to resolve a plurality of requirement descriptions, wherein the providing comprises:
  applying at least one inference rule on the plurality of ontology instances to identify an ontology instance from among the plurality of ontology instances based on the selected one or more environmental parameters;
  extracting semantic inferences from the identified ontology instance; and
  implementing the semantic inferences to the identified ontology instance for providing the knowledge corpus and the recommendations; and generating the requirements specification for the domain by incorporating the user's response to the recommendations, wherein the requirements specification indicates prioritization of a plurality of iterations the plurality of iterations indicative of logical and coherent units of functionalities of the software to be developed.

8. The method as claimed in claim 7, wherein the one or more environmental parameters is one of a domain, a line of business, and a type of project.

9. The method as claimed in claim 7, wherein the requirements specification is at least one of a document detailing requirements, a prototype, and an executable model.

10. The method as claimed in claim 7, wherein the knowledge corpus comprises business processes, rules, policies, partial data models, use cases, test cases, user stories, features, tasks, product backlog, iterations, and prototype plans.

11. The method as claimed in claim 7 further comprises prioritizing the plurality of iterations based on the recommendations.

12. A non-transitory computer-readable medium having embodied thereon a computer program for executing a method comprising:

mapping knowledge elements of at least one ontology instance, selected from among a plurality of ontology instances in a knowledge base, with another ontology instance for a domain, selected from among the plurality of ontology instances based on an input received from a user and wherein the ontology instance defines a common vocabulary in a machine-readable and processable format for users who share information within the domain associated with the software being developed, for which the requirements specification is being generated wherein mapping knowledge elements using one or more bridge classes to specify semantic mappings of conclusions of a first ontology instance to the knowledge elements of a second ontology instance;

providing a knowledge corpus from the knowledge base based on one or more environmental parameters selected by the user and the mapped knowledge elements and using a plurality of lexical decomposition techniques to resolve a plurality of requirement descriptions, wherein:
  the one or more environmental parameters are selected to define requirements for developing functionalities of the software;
  the one or more environmental parameters include a geographical region; and
  the knowledge corpus includes features and associated knowledge elements based on the selected one or more environmental parameters;

receiving at least one modification in the knowledge corpus based on a selection of one or more of the features and the associated knowledge elements in the knowledge corpus by the user, wherein the selection includes one of a modification and enhancement of the features and the associated knowledge elements;

providing recommendations specific to the domain from the knowledge base based on the received modification and at least one inference rule, wherein the providing comprises:
  applying at least one inference rule on the plurality of ontology instances to identify an ontology instance from among the plurality of ontology instances based on the selected one or more environmental parameters;
  extracting semantic inferences from the identified ontology instance; and
  implementing the semantic inferences to the identified ontology instance for providing the knowledge corpus and the recommendations; and generating the requirements specification for the domain by incorporating the user's response to the recommendations, wherein the requirements specification indicates prioritization of a plurality of iterations, the plurality of iterations indicative of logical and coherent units of functionalities of a software to be developed.

13. The non-transitory computer-readable medium method as claimed in claim 12, wherein the environmental parameter is one of a domain, a line of business, and a type of project.

14. The non-transitory computer-readable medium method as claimed in claim 12, wherein the requirements specification is at least one of a machine processable document detailing requirements, a prototype and an executable model.

15. The non-transitory computer-readable medium method as claimed in claim 12, wherein the knowledge corpus comprises business processes, rules, policies, partial data models, use cases, test cases, user stories, features, tasks, product backlog, iterations, and prototype plans.

* * * * *